US007313340B2

(12) United States Patent
Savitzky et al.

(10) Patent No.: US 7,313,340 B2
(45) Date of Patent: Dec. 25, 2007

(54) PAPER CONTROL OF DOCUMENT PROCESSING (75) Inventors: Stephen R. Savitzky, San Jose, CA (US); Ame Elliott, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 122 days.

(21) Appl. No.: 11/015,830

(22) Filed: Dec. 17, 2004

(65) Prior Publication Data

US 2006/0133845 A1   Jun. 22, 2006

(51) Int. Cl.
*G03G 15/00* (2006.01)

(52) U.S. Cl. .......................................... 399/84; 399/81

(58) Field of Classification Search ............. 399/82–85
See application file for complete search history.

(56) References Cited

U.S. PATENT DOCUMENTS

| 5,124,748 | A | * | 6/1992 | Tanabe et al. ................. 399/81 |
| 5,247,371 | A | * | 9/1993 | Hikawa et al. ................ 399/84 |
| 5,666,214 | A | * | 9/1997 | MacKinlay et al. .......... 399/84 |
| 5,940,188 | A | * | 8/1999 | Kurozasa ...................... 399/84 |
| 6,549,299 | B1 | * | 4/2003 | Allen et al. ................. 358/1.18 |
| 2003/0095810 | A1 | * | 5/2003 | Haines et al. ................. 399/84 |

* cited by examiner

*Primary Examiner*—Anjan Deb
*Assistant Examiner*—Timothy J Dole
(74) *Attorney, Agent, or Firm*—Blakely, Sokoloff, Taylor & Zafman LLP (57) ABSTRACT

A method and apparatus for using a sheet of paper to control document processing is described. In one embodiment, the method includes scanning a first sheet of paper and a first document, identifying one or more processing operations identified on the first sheet of paper, performing the one or more processing operations on the first document, and generating a second sheet of paper that encodes the first document and the processing operations.

12 Claims, 6 Drawing Sheets

_102

Finishing Choices

↙ 103

1 or 2 Sided Copies

☐ 1 Sided  
$104_1$

☐ 2 Sided Left Edge Binding  
$104_2$

☐ 2 sided top binding  
$104_3$

Copies Per Page

☐ 2-Columns  
$104_4$

☐ 2-Booklet  
$104_5$

☐ 4 On A Side  
$104_6$

•  
•  
•

Stapling and Punching

☐ Staple  
$104_{n-1}$

☐ 2 Holes Top  
$104_{N-1}$

☐ 3 Holes Left  
$104_N$

Receipt

~401

Scan this page to replicate job

Page 1 Image ~408

Job Information
Ref. Number: 87654093
~401

Kinko's # 4578
2339 El Camino Real
Menlo Park, CA 94026

Completed:
April 2, 2004 1:57 pm
Ricoh Atico 1045
Machine #7
~402

$ 63.17

Finishing Instructions
200 Copies
11x17 paper
2-sided
Booklet fold
2 middle staples
~410

~409

Requirements
11x17 Mid-Gloss Straton Ivory
Full-bleed cover
~411

PAPER CONTROL OF DOCUMENT PROCESSING

FIELD OF THE INVENTION

The present invention relates to the field of document processing; more particularly, the present invention relates to using a sheet of paper (or other suitable material) to select processing operations for a document.

BACKGROUND OF THE INVENTION

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. Oftentimes, many copies of a document must be made so that the document can be shared among colleagues, thus generating even more paper.

To that end, multi-function peripherals (MFPs) have been developed to perform multiple functions on paper documents, including copying, printing, scanning, and transmitting documents. Each MFP usually has a display through which a user may control the MFP and see status of the operation(s) being performed by the MFP. This control includes the selection of finishing options with respect to print operations that the MFP is to perform. These finishing options include such functions as specifying the orientation of the document image to be printed, the number of documents to be printed per sheet, the staple angle and location, the punch style, as well as others.

Although MFPs have sophisticated finishing options, selecting the desired options can be difficult for a number of reasons. First, the screens on the MFPs are small. Second, in order to select finishing options, a user must navigate through multiple screens. Third, the screens provide poor visualization of the finishing choices that have already been selected. Lastly, there is poor support for the discovery of new functions. Thus, the MFP screen interface hinder's the user's ability to access and use these functions.

Cover sheets have been used extensively for routing, distributing, packing, and mailing materials in the past. However, such cover sheets have not been used for specifying finishing options or selecting other processing options with respect to document handling systems such as an MFP. Furthermore, after the processing options have been performed, there is no record of which processing operations were performed with instructions to enable them to be reused.

SUMMARY OF THE INVENTION

A method and apparatus for using a sheet of paper to control document processing is described. In one embodiment, the method comprises scanning a first sheet of paper and a first document, identifying one or more processing operations identified on the first sheet of paper, performing the one or more processing operations on the first document, and generating a second sheet of paper that encodes the first document and the processing operations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for using a sheet of paper to control document processing is described. In one embodiment, the piece of paper includes check boxes or other operation indication areas by which a user can select (e.g., mark) document processing/handling operations (e.g., finishing options).

The terms "paper," "paper medium," or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

In one embodiment, the method comprises scanning a first sheet of paper and a first document, identifying one or more processing operations identified on the first sheet of paper, performing the one or more processing operations on the first document, and generating a second sheet of paper that encodes the first document and the processing operations.

In the following description, numerous details are set forth, such as distances between sizes of check boxes, location of check boxes, etc. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Exemplary Coversheet

In one embodiment, a cover sheet is used by an individual to select processing operations to be applied to a document. "Document" refers to any collection of information capable of being stored electronically, including but not limited to text, word processing and spreadsheet files, e-mail messages, voice and audio recordings, images, archives of documents, and video recordings. The document may be one or more pages and may be a complete work or part of a work.

In one embodiment, the cover sheet is a sheet of paper that includes a number of areas that may be marked or highlighted by a user to indicate the selection of one or more processing operations. In one embodiment, the cover sheet may comprise a note that sticks to a sheet, such as a Post-it note.

The document processing operations may be finishing options. These finishing choices may include, for example, documents per sheet, orientation, staple angle and location, punch style, duplicating paper size, duplexing, page size, etc. Thus, in one embodiment, the selection of one or more of the processing operations cause the document to be output in a manner desired by the individual that marked the cover sheet.

In one embodiment, the selections are made by placing marks on the cover sheet. The cover sheet may include check boxes to supply locations for an individual to mark the processing operations that are desired. For illustrative purposes, the following description sets forth the invention in terms of check boxes and other indication or selection areas on cover sheets. However, one skilled in the art will recognize that the invention can also be implemented using check boxes, circled words, etc. on other types of identifier sheets, and that such implementations would not depart from the essential characteristics of the present invention.

Figure 1:
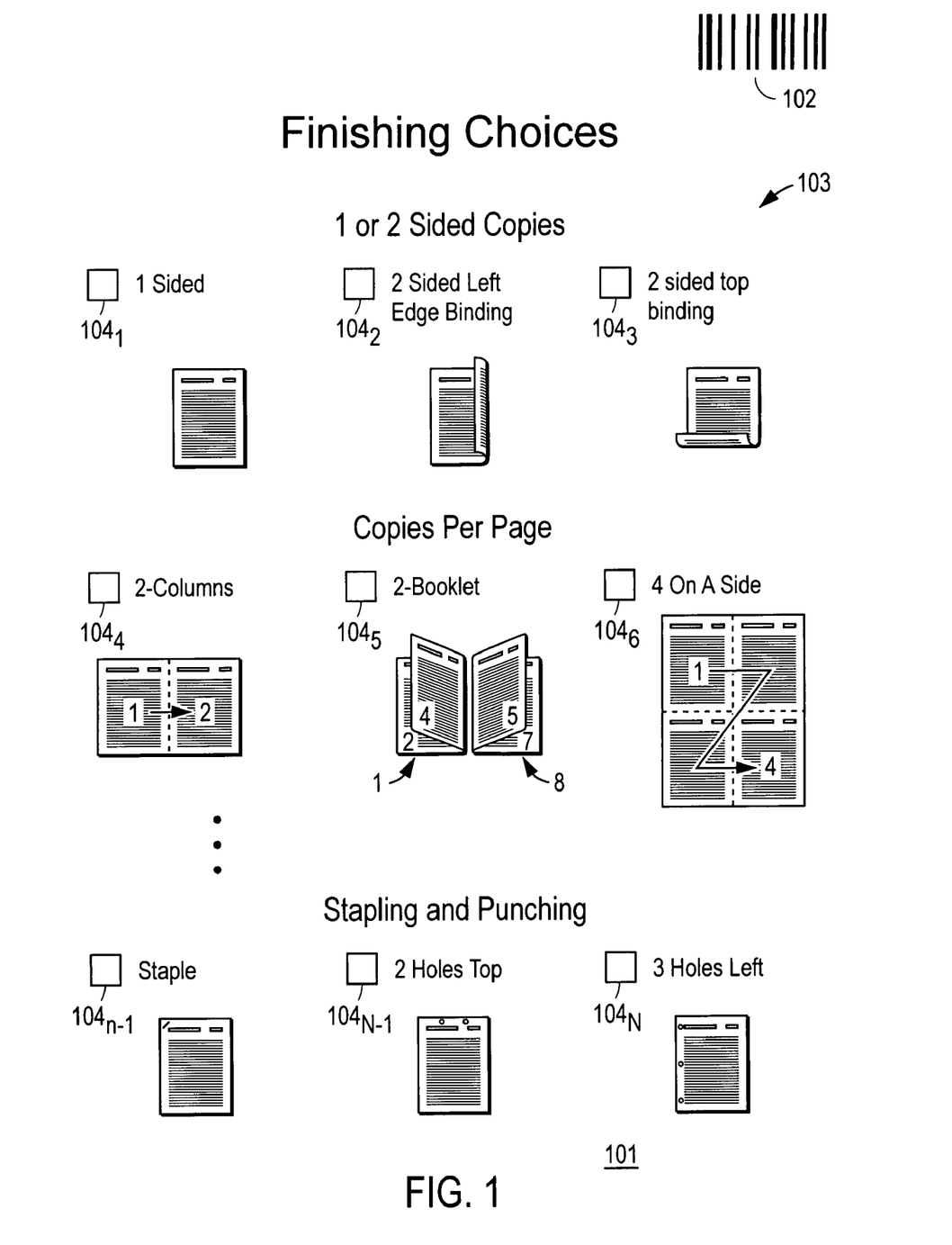
FIG. 1 illustrates an exemplary cover sheet.

FIG. 1 illustrates an exemplary cover sheet. Referring to FIG. 1, there is shown an example of check boxes appearing on a cover sheet 101. In one embodiment, cover sheet 101 is a piece of paper that includes machine-readable code 102 and processing operation selection area 103. Processing operation selection area 103 allows a user to specify an action to be taken. The particular layout and components shown in FIG. 1 are merely exemplary.

In the example of FIG. 1, check boxes $104_{1-N}$ are located on cover sheet 101. In general, check boxes $104_{1-N}$ may be located anywhere in processing operation selection area 103 in close proximity to printed word specifying the processing operation and/or an icon (e.g., thumbnail-sized icon) illustrating the processing selection to ensure a user desiring an action to be performed to a particular document is able to determine the correct check box to mark their selection.

One embodiment of the system of the present invention is capable of recognizing selected, or marked, check boxes regardless of the marks made in them. The user may mark the check box by filling in the check box or putting another mark (e.g., a check mark) in the box. In one embodiment, if any of the checkboxes has a sufficient number of dark pixels, it is considered marked. In consideration of the fact that sometimes small bits of dust or noise in the scanning mechanism might form a dark pixel, it is desirable to remove individual dark pixels or small dots from the checkbox image before deciding if it has been marked. Removing noise from images is well understood in the art and is typically done using morphological operations. For a description of morphological operations, see Dougherty, Edward R; Jaakko Astola, "An Introduction to Nonlinear Image Processing" (Vol TT16) Tutorial texts in optical engineering, O'Shea, Donald ed., SPIE Optical Engineering Press, Bellingham, Wash., 1994.

Check boxes $104_{1-N}$ as shown in FIG. 1 are square shaped and are next to, or in close proximity to, a word indicating the desired action (e.g., "2-Columns"). Other formats and shapes (e.g., circles, ovals, etc.) are possible and will be recognized by one skilled in the art in light of this description. For example, another form of indication may be circular or elliptical to provide a user an area to mark to specify an action.

In one embodiment, such an arrangement would signal to a document processing system (e.g., MFP) of the present invention that the requested action should be performed on the document that follows cover sheet 101. That is, the cover sheet can be created and printed out with check boxes, and then a user can select an action(s) on the cover sheet using check boxes and then put it through the MFP. Thus, the entire process can be performed at a multi-function peripheral (MFP).

Check box $104_7$ may be marked by the user to select the action "staple". If this is the case, the document scanned after coversheet 101 is stapled. If the check box $104_4$ is selected and the operation "2-Columns" is selected, the document scanned after coversheet 101 will be converted into two columns.

In one embodiment, locating marked check boxes is performed using morphological operations well known to those skilled in the art. More specifically, a program performing morphological operations takes an input image and a "kernel" that resembles the object that is being sought, namely a check box of a given size in this case and compares the kernel with the input image at every pixel. Every time the kernel at a given position in the image exactly matches the input image, it leaves a dark pixel in the output image. In other words, the output image has a dark pixel in every place a check box appears in the input image. Processing logic can search for pixels in the outcome image after comparison and produce a list of image coordinates where there are marked check boxes.

Since the layout exists for the cover sheet, processing logic can find the check boxes and will look in the corners of the targets or objects. Similarly, it can keep track of where the boxes are printed and look precisely for the boxes later.

In an alternative embodiment, each processing operation has a machine-readable code (e.g., bar code) associated with it for identification to the document processing system (e.g., MFP). In one embodiment, this enables a document processing system to access information about the cover sheet using information from the machine readable code (e.g., a URL or other locator) to enable location of the processing operation selection areas and individual check boxes (or other selection areas).

Cover Sheet Processing

Figure 2:
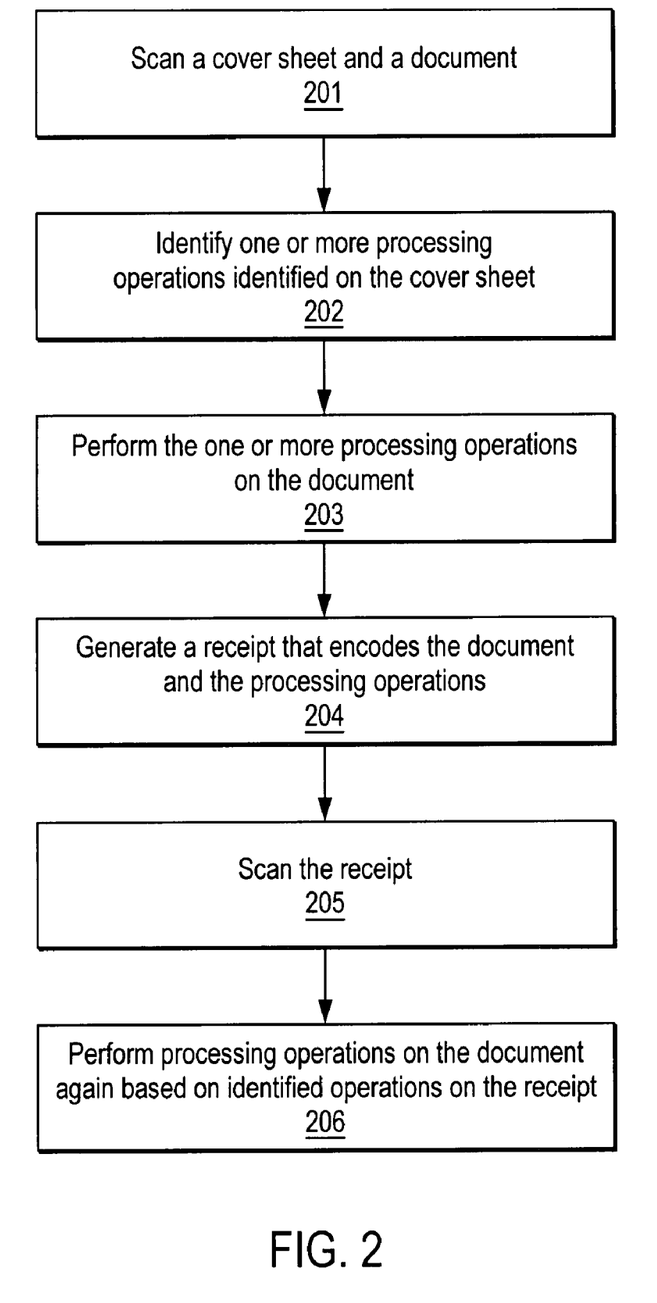
FIG. 2 is a flow diagram of one embodiment of a process for using a sheet of paper to control document processing.

FIG. 2 is a flow diagram of one embodiment of a process for using a sheet of paper to control document processing. The process is performed by processing logic that may comprise hardware (e.g., circuitry, dedicated logic, etc.), software (such as is run on a general purpose computer system or a dedicated machine), or a combination of both.

Referring to FIG. 2, the process begins by processing logic scanning a cover sheet and a document (processing block 201). In one embodiment, the cover sheet is scanned in response to an input. The input may occur in response to a button being depressed.

Figure 3:
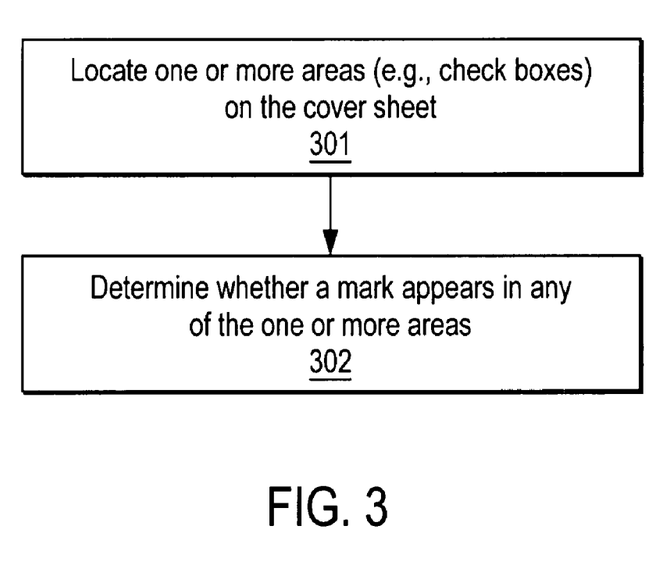
FIG. 3 is a flow diagram of one embodiment of a process for identifying the one or more processing operations that have been selected on a cover sheet.

Referring back to FIG. 2, after scanning the first sheet of paper, processing logic identifies one or more processing operations identified on the cover sheet (processing block 202). FIG. 3 is a flow diagram of one embodiment of a process for identifying the one or more processing operations that have been selected on a cover sheet. The process is performed by processing logic that may comprise hardware (e.g., circuitry, dedicated logic, etc.), software (such as is run on a general purpose computer system or a dedicated machine), or a combination of both. Referring to FIG. 3, the process begins by processing logic locating one or more areas (e.g., check boxes) on the cover sheet (processing block 301). In one embodiment, each of the processing operation selection areas may be selected by locating a machine readable code (e.g., bar code) on the cover sheet and decoding the machine readable code to identify locations of the areas. Once located, processing logic determines whether a mark appears in any of the one or more areas (processing block 302). Those areas having a mark therein represent processing operations that have been selected.

In one alternative embodiment, processing logic identifies processing operations by retrieving a layout of the cover sheet from memory to locate areas to select operations and reviewing the areas to determine whether one or more operations have been selected. In another alternative embodiment, processing logic identifies processing operations by reading a machine-readable identifier associated with each checkbox having a mark therein. In other embodiments, processing logic identifies processing operations based on an indication (e.g., marked checkbox) on another document, such as a receipt described below, or by determining that the processing operations are to be performed on a document based on determining that no pages follow the cover sheet in the scanner after scanning the cover sheet.

Referring back to FIG. 2, once the processing operations have been identified, processing logic performs the one or more processing operations on the document (processing block 203).

When finished with the processing operations, processing logic generates a receipt that encodes the document and the processing operations (processing block 204). At some time thereafter, in one embodiment, processing logic scans the receipt (processing logic 205) and performs the processing operations on the document again based on identified operations on the receipt (processing block 206).

In an alternative embodiment, processing logic scans the receipt of paper and another receipt or cover sheet and a new document. Processing logic performs an aggregation of processing operations on the new document, where the aggregation of processing operations are a combination of processing operations specified on the receipt and third sheet of paper (i.e., a cover sheet or another receipt).

An Exemplary Receipt

Figure 4:
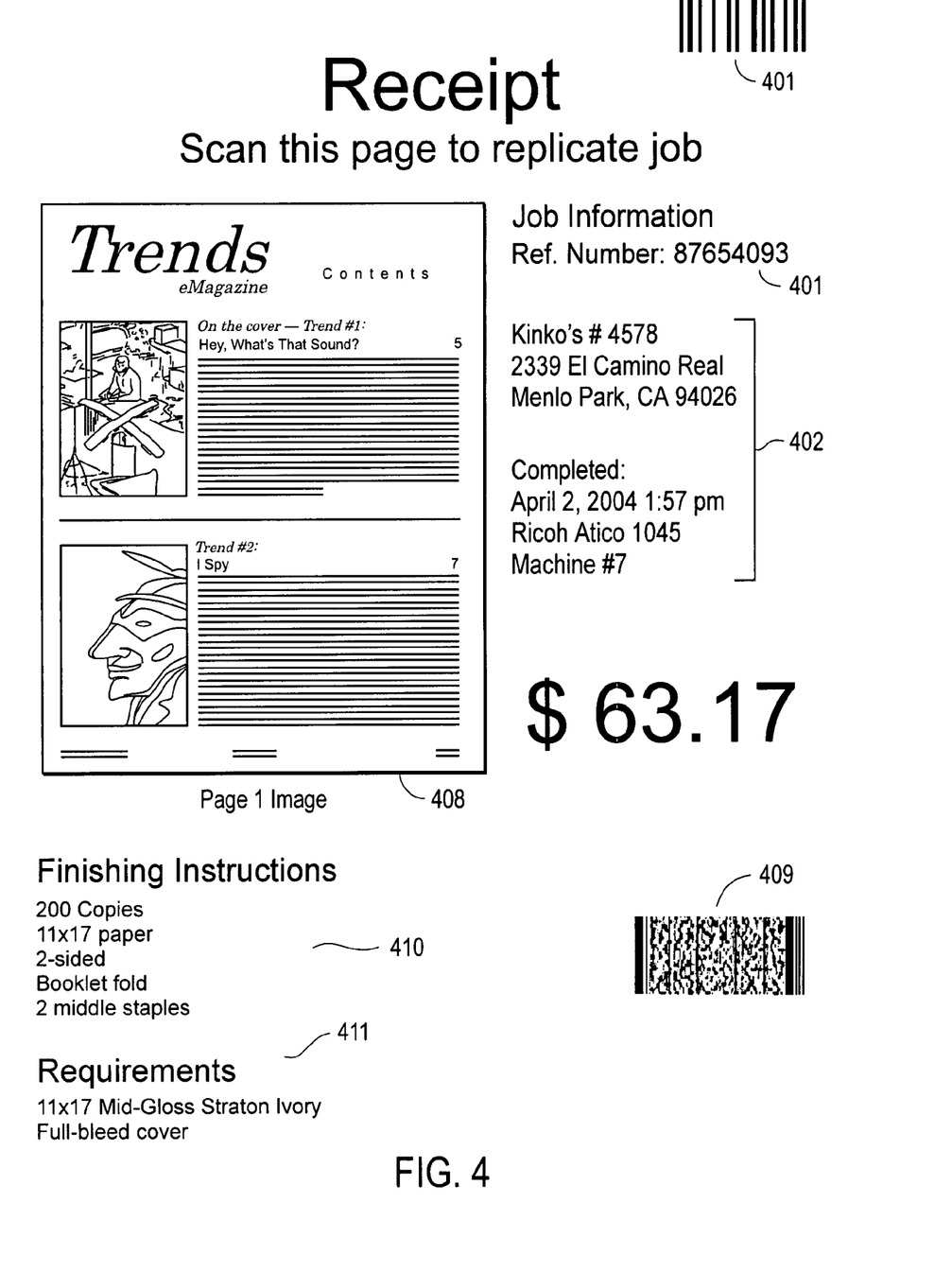
FIG. 4 is an example of a receipt.

The receipt may be a sheet of paper. An example of a receipt is shown in FIG. 4. In one embodiment, the receipt specifies one or more prerequisites to perform the one or more processing operations. Referring to FIG. 4, receipt 400 includes an image of page 1 of the document that is associated with receipt 400, along with finishing instructions 410 and requirements 411. Other information 402 may be included such as the location of the company that performed the processing operations and when it was completed, along with information specifying job identification 401.

In one embodiment, receipt 400 includes a barcode 401 that stores the document and/or an indication of the selected processing operations.

Receipt 400 could be stored electronically and if the user desired to have additional copies made, then the receipt could be scanned and the finishing information could be regenerated from the receipt.

Barcode 409 identifies a saved copy of the entire scanned document, so that the entire job can be re-run using only the receipt as input.

In one embodiment, multiple sheets could be used. In such a case, the first cover sheet causes the document processing system (e.g., MFP) to execute the commands indicated on the sheet until a new coversheet with different instructions is encountered in the stack of scanned in sheets of paper. For example, a stack of separate copy jobs could be made with a cover sheet and its associated document on top of another cover sheet and its associated document. As another example, a new cover sheet could be used for each chapter of a document. Upon encountering the new or subsequent cover sheet, the document processing system perform the processing operations specified on the later cover sheet.

Figure 5:
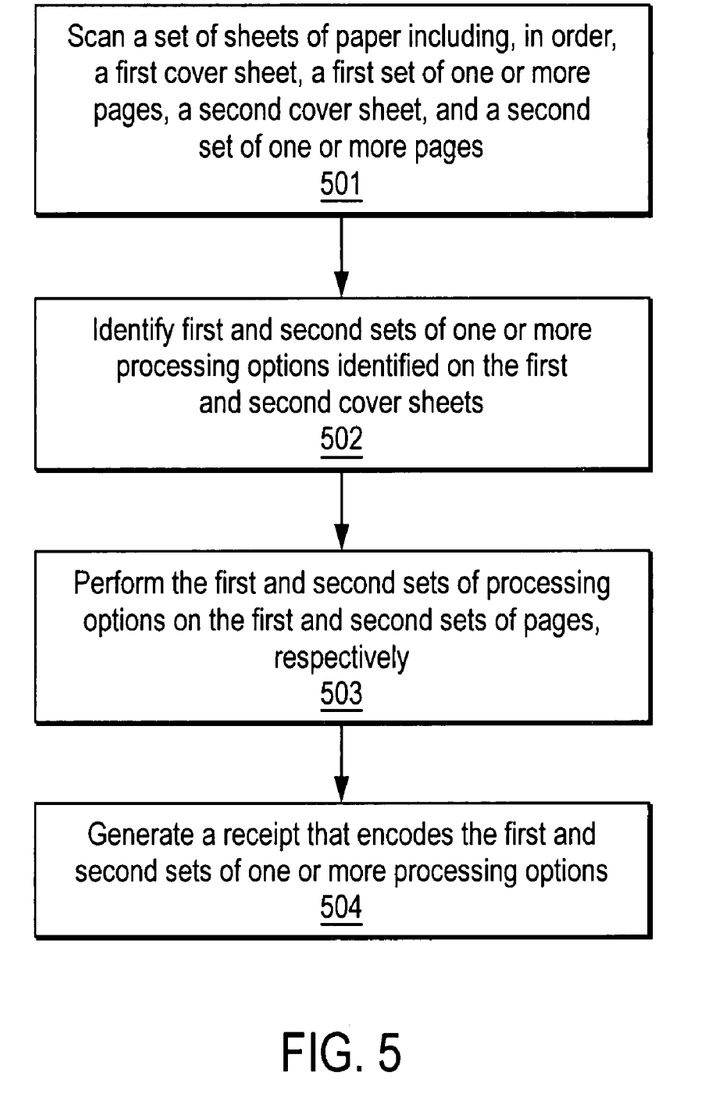
FIG. 5 is a flow diagram of one embodiment of a process for using a combination of multiple cover sheets or receipts to control document processing.

FIG. 5 is a flow diagram of one embodiment of a process for using a combination of multiple cover sheets or receipts to control document processing. The process is performed by processing logic that may comprise hardware (e.g., circuitry, dedicated logic, etc.), software (such as is run on a general purpose computer system or a dedicated machine), or a combination of both.

Referring to FIG. 5, the process begins by processing logic scanning a set of sheets of paper including, in order, a first cover sheet, a first set of one or more pages, a second cover sheet, and a second set of one or more pages (processing block 501).

After scanning, processing logic identifies first and second sets of one or more processing options identified on the first and second cover sheets (processing block 502).

Once identified, processing logic performs the first and second sets of processing options on the first and second sets of pages, respectively (processing block 503).

In one embodiment, after performing the processing options, processing logic generates a receipt that encodes the first and second sets of one or more processing options. The receipt may also encode the first and second sets of pages (e.g., documents) or provide a pointer (e.g., link) to whether the first and second sets of pages are stored.

An Exemplary System

Figure 6:
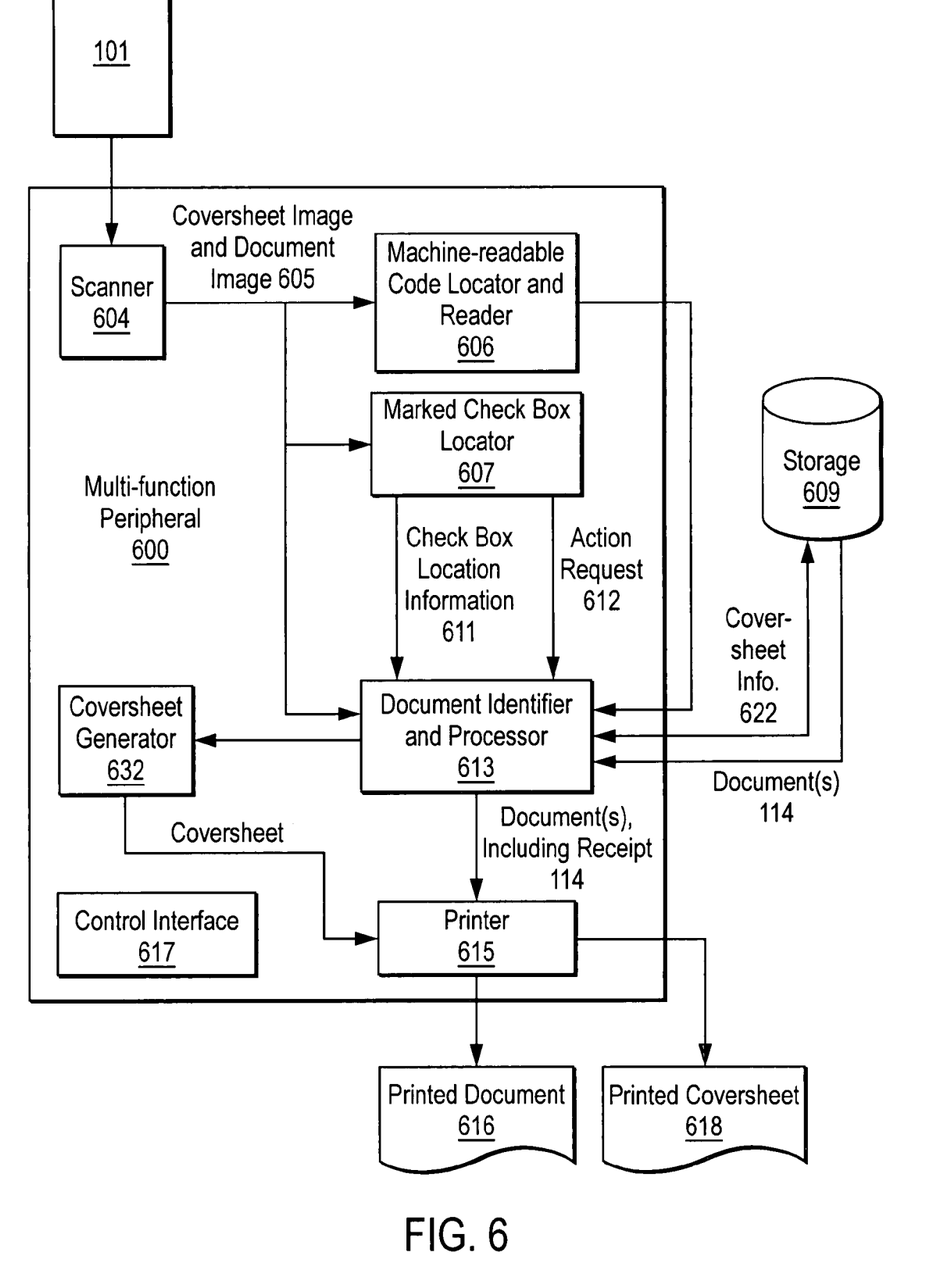
FIG. 6 is a block diagram depicting one embodiment of a functional architecture of a system for reading marked check boxes and performing actions on documents responsive to the marked check boxes.

FIG. 6 is a block diagram depicting one embodiment of a functional architecture of a system for reading marked check boxes and performing actions on documents responsive to the marked check boxes.

The use of check boxes is described herein in the context of a multifunction peripheral (MFP) 600 including scanner 604, a machine-readable code locator and reader 606, a marked check box locator 607, a document processor 613, and printer 615. Marked check box locator 607 may also include functionality for locating processing operation selection area 102 within cover sheet 101; alternatively, such functionality may be provided in a separate component (not shown).

MFP 600 may also contain other components, some of which may not be required for the operation of embodiments of the present invention. MFP 600 may contain a network interface card (not shown), which can receive processing requests from the external network, a fax interface, media capture devices, a media capture port, and the like.

Control interface 617 provides a mechanism by which the user can initiate, configure, monitor, and/or terminate MFP 600 operations, for example, to make copies, scan documents, and print faxes. In one embodiment, interface 617 includes a keypad, display, touchscreen, or any combination thereof.

The components shown in MFP 600 are functional components that may be implemented using any combination of hardware elements, software, or the like. For example, the functionality of reader 606 and locator 607 may be implemented within a single hardware component and/or software module, or they may be broken out into separate functional components. Accordingly, the architecture shown in FIG. 6 is intended to illustrate the overall functionality of the invention according to one embodiment, and is not intended to limit the scope of the claimed invention to any particular set of components.

In one embodiment, MFP 600 can access other forms of media through electronic data input peripherals (not shown) including, for example, magnetic media readers for magnetic media such as floppy disks, magnetic tape, fixes hard disks, removable hard disks, memory cards, and the like. Peripherals may also include optical media readers (not shown) for optical storage media such as CDs, DVDs, magneto-optical disks, and the like. In addition, in one embodiment, MFP 600 is communicatively coupled to storage device 609, which may be a hard drive or other device capable of storing digital documents, for example in database form. Storage device 609 may be at the same location as MFP 600, or it may be remotely located, connected for example via a network.

As described above in connection with FIG. 1, cover sheet 101 includes machine-readable identifier 102 and processing operation selection area 103. Alternatively, cover sheet 101 may have an embedded RFID tag containing an identifier 102. Check boxes $104_{1-N}$ are included on coversheet 101 and may be marked to specify one or more actions to be performed to a document.

MFP 600 receives an image 605 of cover sheet 101 and a document, for example by scanning cover sheet 101 and the document using scanner 604 according to techniques that are well known in the art. Alternatively, MFP 600 may use other input mechanisms known to persons of ordinary skill in the art to receive the image of cover sheet 101 and/or the document. For example, MFP 600 may receive the image via e-mail, fax, retrieval from previously stored cover sheet 101 or document images, or the like.

MFP 600 then locates the machine readable identifier 102 within image 605 of cover sheet 101, and reads the identifier 102. In one embodiment, this may be performed by passing image 105 or the physical page in the case of RFID to code locator and reader 606, which locates and reads machine readable identifier 102. Machine readable identifier 102 identifies the storage location of data corresponding to cover sheet 101, including information regarding the location of check boxes $104_{1-N}$ and the processing operation(s) associated with each of check boxes $104_{1-N}$, such as with a map. In one embodiment, identifier 102 is a URL or the like that identifies the stored information by location and filename. For example, identifier 102 may identify documents within storage device 609.

Code locator and reader 606 passes the machine readable identifier 102 to document identifier and processor 613 as described in more detail below.

MFP 600 locates check box(s) that have been marked on processing operation selection area 103. In one embodiment, marked check box locator 607 component of MFP 600 performs the operation. Locating check boxes may be performed in response to the user specifying, via control interface 617, that one or more marked check boxes are present. Alternatively, locator 607 may be configured to automatically attempt to locate marked check boxes whenever a cover sheet 101 has been scanned by scanner 604.

In one embodiment, marked check boxes are recognized by check box locator 607. Alternative methods for locating objects in an image are known in the art.

Based on which of the check boxes have been marked in the processing operation selection area 103 of cover sheet 101, check box locator 607 identifies the desired action(s). In one embodiment, reader 607 passes the action request 612 to document identifier and processor 613.

If more than one check box is found marked in action indication, document identifier and processor 613 sorts the actions in an appropriate order. MFP 600 may alert the user to the presence of multiple actions on a document and request clarification (via control interface 617, for example) as to the intended order to carry out the actions.

Once actions have been determined, document identifier and processor 613 performs the specified action(s) in the determined order on the document. Some examples of check boxes and their corresponding actions include:

Printer 615 prints the document once the actions have been performed.

In one embodiment, document identifier and processor 613 operates as a receipt generator. This may be performed using either as a separate functional module or some other component. When included, this receipt generator gathers the information regarding the selected processing operations and/or an electronic version of the document and generates receipt 401 to be sent to printer 615 to be output as printed receipt 620. The receipt generator also stores the information associated with receipt or a copy of receipt 401 to allow to enable the processing operations to be determined and performed again when and if receipt is scanned into MFP 600 by scanner 604.

In one embodiment, MFP 600 includes a cover sheet generator, either as a separate functional module or as a component of document identifier and processor 613 or some other component. The cover sheet generator is therefore an optional component that need not be included, and indeed is absent in some embodiments. When included, cover sheet generator generates a cover sheet 101 to be sent to printer 615 to be output as printed cover sheet 606.

In one embodiment, MFP 601 includes a disable button or other input to disable the cover sheet processing so that a user having a cover sheet scanned into MFP 601 is able to prevent MFP 601 from performing any processing operations identified on the cover sheet. This may be useful, for example, when attempting to make a copy of a cover sheet.

In an alternative embodiment, paper is not used and instead the control operations are printed on a surface such as a sheet of white vinyl or a white-board that could be marked with erasable pens and wiped after use.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

We claim:

1. A method comprising:
    scanning a first sheet of paper;
    identifying one or more processing operations identified on the first sheet of paper;
    performing the one or more processing operations on a first document; and
    generating a second sheet of paper that encodes the processing operations, wherein the first sheet of paper includes one or more areas designated for indicating selection of processing operations, wherein at least one of the one or more areas comprises a check box, and further wherein identifying the one or more processing operations comprises locating the one or more areas on the first sheet, determining whether a mark appears in any of the one or more areas, and reading a machine-readable identifier associated with each checkbox having a mark therein, the one or more areas having a mark therein representing the one or more processing operations selected.

2. The method defined in claim 1 wherein the machine-readable identifier comprises a bar code.

3. A method comprising:
    scanning a first sheet of paper;
    identifying one or more processing operations identified on the first sheet of paper;
    performing the one or more processing operations on a first document;
    generating a second sheet of paper that encodes the processing operations;
    scanning the second sheet of paper;
    determining the processing operations are to be performed on the first document; and
    performing the processing operations on the first document based on identified operations on the second sheet.

4. The method defined in claim 3 wherein determining that the processing operations are to be performed on the first document is based on an indication on the second sheet.

5. The method defined in claim 4 wherein the indication comprises a marked check box.

6. The method defined in claim 3 wherein determining that the processing operations are to be performed on the first document is based on determining that no pages follow the second sheet after scanning the second sheet.

7. A method comprising:
    scanning a first sheet of paper;
    identifying one or more processing operations identified on the first sheet of paper;
    performing the one or more processing operations on a first document;
    generating a second sheet of paper that encodes the processing operations;
    scanning the second sheet of paper and a second document;
    performing the processing operations on the second document based on identified operations on the second sheet.

8. A method comprising:
    scanning a first sheet of paper;
    identifying one or more processing operations identified on the first sheet of paper;
    performing the one or more processing operations on a first document;
    generating a second sheet of paper that encodes the processing operations;
    scanning the second sheet of paper, a third sheet of paper, and a second document; and
    performing an aggregation of processing operations on the second document, the aggregation being a combination of processing operations specified on the second and third sheets of paper.

9. An apparatus comprising:
    a scanner to scan a first sheet of paper and a first document;
    a processing unit to identify one or more processing operations identified on the first sheet of paper and perform the one or more processing operations on the first document; and
    a generator to generate a second sheet of paper with data that represents an encoding of the processing operations, wherein:
        the scanner scans the second sheet of paper, and the processing unit performs the processing operations on the first document based on identified operations on the second sheet.

10. An apparatus comprising:
a scanner to scan a first sheet of paper and a first document;
a processing unit to identify one or more processing operations identified on the first sheet of paper and perform the one or more processing operations on the first document; and
a generator to generate a second sheet of paper with data that represents an encoding of the processing operations, wherein:
the scanner scans the second sheet of paper and a second document, and
the processing unit performs the processing operations on the second document based on identified operations on the second sheet.

11. An apparatus comprising:
a scanner to scan a first sheet of paper and a first document;
a processing unit to identify one or more processing operations identified on the first sheet of paper and perform the one or more processing operations on the first document; and
a generator to generate a second sheet of paper with data that represents an encoding of the processing operations, wherein:
the scanner scans the second sheet of paper, a third sheet of paper, and a second document; and
the processing unit performs an aggregation of processing operations on the second document, the aggregation being a combination of processing operations specified on the second and third sheets of paper.

12. A method comprising:
scanning a set of sheets of paper including, in order, a first sheet of paper, a first set of one or more pages, a second sheet of paper, and a second set of one or more pages;
identifying first and second sets of one or more processing options identified on the first sheet of paper and the second sheet of paper;
performing the first set of one or more processing options on the first set of pages;
performing the second set of one or more processing options on the second set of pages; and generating a third sheet of paper that encodes the first and second sets of one or more processing options.

* * * * *